United States Patent [19]

Gerfast et al.

[11] Patent Number: 5,516,055

[45] Date of Patent: May 14, 1996

[54] TAPE TENSION ENHANCEMENT FOR BELT DRIVEN TAPE CARTRIDGE CORNER ROLLERS

[75] Inventors: Sten R. Gerfast, Mendota Heights; Daniel C. Egan, Oakdale; Frank H. Phillips, Shoreview; Clarence W. Schultz, St. Paul; Ronald D. Stimpson, Camarillo, all of Minn.

[73] Assignee: Minnesota Mining and Manufacturing Company, St. Paul, Minn.

[21] Appl. No.: 218,618

[22] Filed: Mar. 28, 1994

[51] Int. Cl.⁶ .................................................. G11B 23/087
[52] U.S. Cl. ...................................... 242/340; 242/352.4
[58] Field of Search .................................. 242/340, 341, 242/352.4; 198/813, 814

[56] References Cited

U.S. PATENT DOCUMENTS

| | | |
|---|---|---|
| 3,692,255 | 9/1972 | Von Behren . |
| 3,735,940 | 5/1973 | Schwartz . |
| 3,826,489 | 7/1974 | Watkins, Jr. ............... 242/346.2 X |
| 4,102,516 | 7/1978 | Anglin et al. . |
| 4,162,774 | 7/1979 | Bowers . |
| 4,198,013 | 4/1980 | Anglin et al. . |
| 4,333,618 | 6/1982 | Seaman ..................... 242/352.4 X |
| 4,457,473 | 7/1984 | Mroz et al. . |
| 4,523,727 | 6/1985 | Morioka . |
| 4,607,808 | 8/1986 | Collins ........................ 242/346.2 |
| 4,688,742 | 8/1987 | Hettich ........................ 242/352.4 |
| 5,204,796 | 4/1994 | Koizumi et al. ............ 242/346.2 X |
| 5,314,140 | 5/1994 | Rotter ......................... 242/352.4 |
| 5,362,009 | 11/1994 | Howard, Jr. et al. ....... 242/346.2 X |

FOREIGN PATENT DOCUMENTS 63-114471  7/1988  Japan .
 3-94685   9/1991  Japan .

OTHER PUBLICATIONS

"General Design Principles," Shigley et al., *Mechanical Engineering Design*, Fifth Edition, McGraw-Hill Book Company, pp. 41, 59.

*Primary Examiner*—Daniel P. Stodola
*Assistant Examiner*—William A. Rivera
*Attorney, Agent, or Firm*—Gary L. Griswold; Walter N. Kirn; H. Sanders Gwin, Jr.

[57] ABSTRACT

A corner roller tape tension enhancer assembly for use with a corner roller in a belt driven magnetic tape cartridge. The assembly comprises a cylindrical corner roller having an outer wall for contact with a drive belt and an inner wall suitable for mounting the corner roller on an axial mounting structure. The assembly also comprises a fatigue resistant metal spring positioned against a portion of the corner roller for controlling magnetic tape tension and to produce a uniform tape tension with respect to drive force over a wide speed range.

20 Claims, 6 Drawing Sheets

TAPE TENSION ENHANCEMENT FOR BELT DRIVEN TAPE CARTRIDGE CORNER ROLLERS

BACKGROUND OF THE INVENTION

This invention relates to magnetic tape cartridges of the belt driven type, for example as shown in U.S. Pat. No. 3,692,255 issued to Von Behren. These cartridges require a drive belt which presses against the supply and take-up rolls of magnetic tape to move the tape from one roll past a read/write mechanism, when inserted in a drive, and onto a second roll. The drive belt extends around a drive roller and guide rollers, also referred to as corner rollers, while simultaneously engaging the magnetic tape rolls. Tape tension is desirable to facilitate contact with a read/write head and to improve overall performance of the tape cartridge.

Various means for providing belt drag or tape tension in magnetic tape cartridges have been disclosed. For example, one reference discloses a friction brake shoe across which a drive belt must pass to apply drag to the belt. Another reference describes the use of guide rollers rotating on shafts in which the shafts and the guide rollers are constructed of materials which produce a predetermined amount of friction or drag. It is also known to use a similar technique in which the guide rollers have a compressible rubber core and a rigid peripheral portion which function to provide a small drag to each roller. Other means of creating drag comprises use of a bowed rotating elastomeric washer, or a washer backed with a spring to the axis of the roller. Use of molded plastic guide rollers each having a coil spring formed integrally with the guide roller is also disclosed. A drawback to these constructions is the characteristic of plastic springs to experience creep and stress relaxation under load during the product's life cycle. The product will then exhibit tape tension variation and so lead to product failure.

SUMMARY OF THE INVENTION

The invention comprises a corner roller tape tension enhancer assembly for use with a corner roller in a belt driven magnetic tape cartridge with components enclosed within a cartridge housing. The assembly comprises a cylindrical corner roller having an outer wall for contact with a magnetic tape drive belt which is driven with a drive force from a drive mechanism external of the assembly and an inner wall suitable for mounting the corner roller on an axial mounting structure. A fatigue resistant metal spring is positioned against a portion of the corner roller for increasing the drag force on the corner roller by a constant value. This permits control of the tension of the magnetic tape and improvement in the uniformity of magnetic tape tension with respect to belt drive force over a wide range of tape speeds.

DETAILED DESCRIPTION OF THE INVENTION

Figure 1:
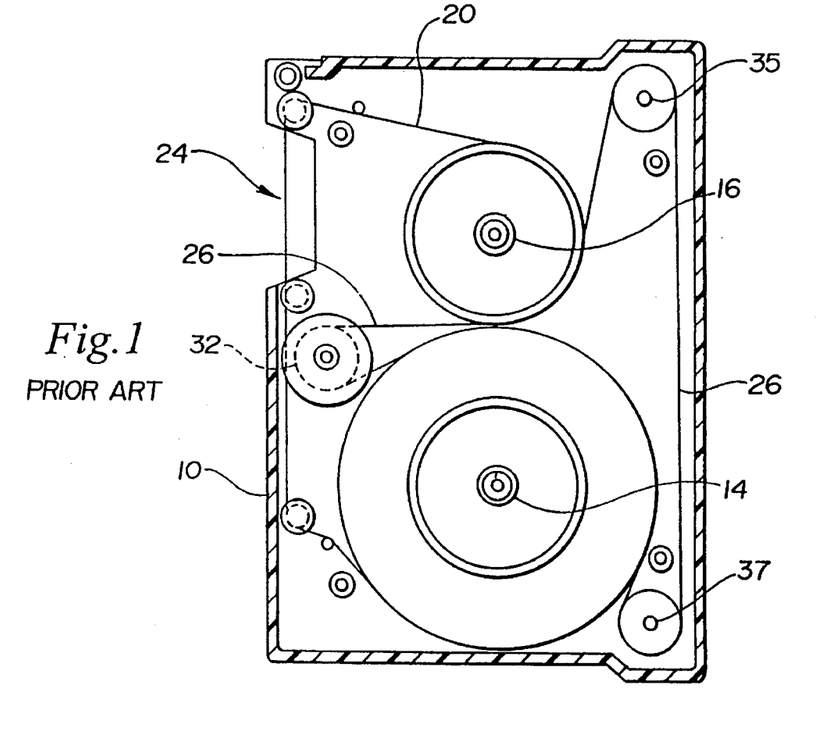
FIG. 1 is a plan view of a prior art tape cartridge without a cover plate.

FIG. 1 discloses a known magnetic tape cartridge assembly 10. Assembly 10 comprises a supply hub 14 and a take-up hub 16 for magnetic tape 20. Tape 20 is designed for data transfer at a read/write location 24 by contact with a head mechanism in a drive (not shown). The movement of tape 20 is achieved by the contact of drive belt 26 with the tape 20 on hubs 14, 16. Drive belt 26 is typically driven by drive roller 32, which is driven by a drive puck in the drive external to the cartridge. Motion of drive belt 26 is guided by corner rollers 35, 37. It is desirable to create and control the tension of tape 20 to facilitate contact with a read/write head and to improve overall performance of the tape cartridge.

Figure 2:
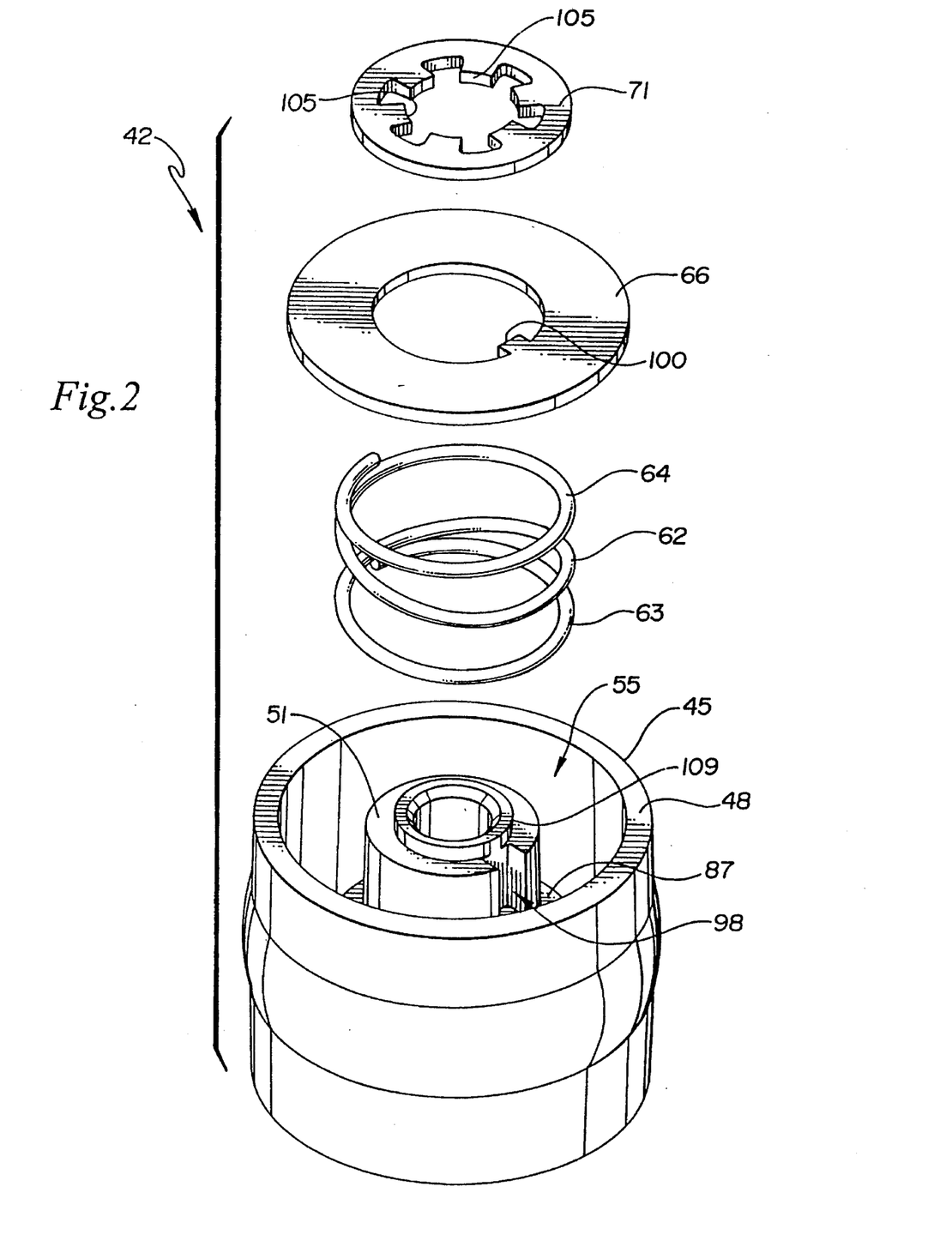
FIG. 2 is an assembly view of a corner roller assembly.

Ideally, tape cartridges should have high tape tension but a very low drive force or low power consumption. Also, a preferred tape cartridge should produce a uniform tape tension with respect to drive force over a wide range of tape speeds. FIG. 2 discloses a corner roller assembly 42 according to the present invention which is designed to achieve these optimal characteristics with few parts and low cost. Corner roller assembly 42 comprises a cylindrical corner roller 45 having an outer wall 48 designed for contact with, and guiding of, an elastomeric tape drive belt and an inner wall 51 suitable for mounting the corner roller on an axial mounting structure, such as a pin or post. Outer wall 48 and inner wall 51 define an annular space or region 55 between the two wall structures. A fatigue resistant metal spring 62 is positioned within annular region 55 for controlling tension of the magnetic tape and to produce a uniform tape tension with respect to drive force over a wide speed range. Fatigue resistant metal spring 62 has a first end coil portion 63 and a second end coil portion 64. Means for retaining spring 62 within the annular region is also provided. In this embodiment such means comprises thrust washer 66 and retaining ring 71.

Corner roller assembly 42 preferably functions within a wide range of tape speeds from as low as 2.5 millimeters/second to as high as 3048 millimeters/second. When fatigue resistant metal spring 62 is a metal coil spring having a low spring rate, which is preferred, then the corner roller assembly creates a corner roller drag force variance of less than about 20 percent over time. This is critical in view of known tape cartridges in which corner roller drag variability significantly affects tape tension variability. For example, in a test of corner roller variability of assembly 42, a variability of approximately 2% with a standard deviation from sample to sample of 7% was observed. Known corner rollers vary from unit to unit approximately 3% to 7% with an average variation of 5%. This invention reduces tape tension variability. In addition, a reduction of this component of total tape tension variability directly improves the performance and reliability of tape cartridges.

Figure 3:
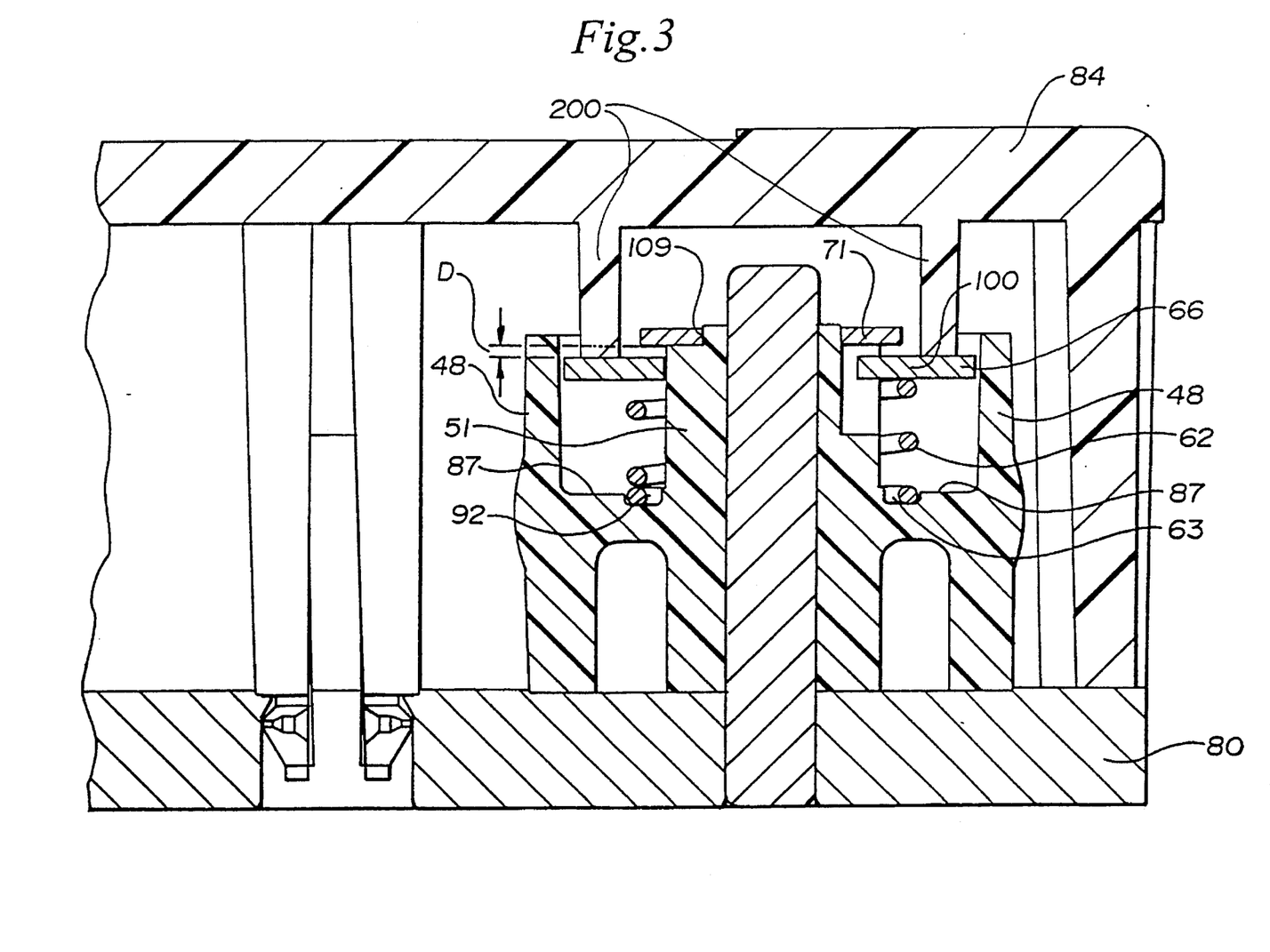
FIG. 3 is a section view of the corner roller assembly of FIG. 2 within a tape cartridge.

FIGS. 2 and 3 disclose the operation of the retaining means and the metal spring 62 within corner roller 45. FIG. 3 shows the corner roller assembly within a tape cartridge enclosure comprising a baseplate 80 and a cover 84. Spring 62 is positioned within the annular region so that first portion 63 is at the base or web 87, connecting the inner and outer walls of the cover roller. In the embodiment shown in FIG. 3, base 87 further comprises a spring centering taper 92 which facilitates positioning of the spring. In order to prevent rotation of the spring within the corner roller, the corner roller inner wall 51 is keyed at location 98 (FIG. 2) for receipt of a protruding key structure 100 formed as part of thrust washer 66. Thus, the cylindrical corner roller and the thrust washer are each shaped to maintain identical speeds of rotation. Retaining ring 71 comprises a plurality of gripping tabs 105 which allow positioning on a portion 109 (FIG. 3) of inner wall 51. The embodiment of assembly 42 shown in FIG. 3 discloses the feature of the assembly to overcome certain tolerances of manufacturing imprecision of the cartridge enclosure, for example as shown by the distance D between retaining ring 71 and thrust washer 66.

Figure 4:
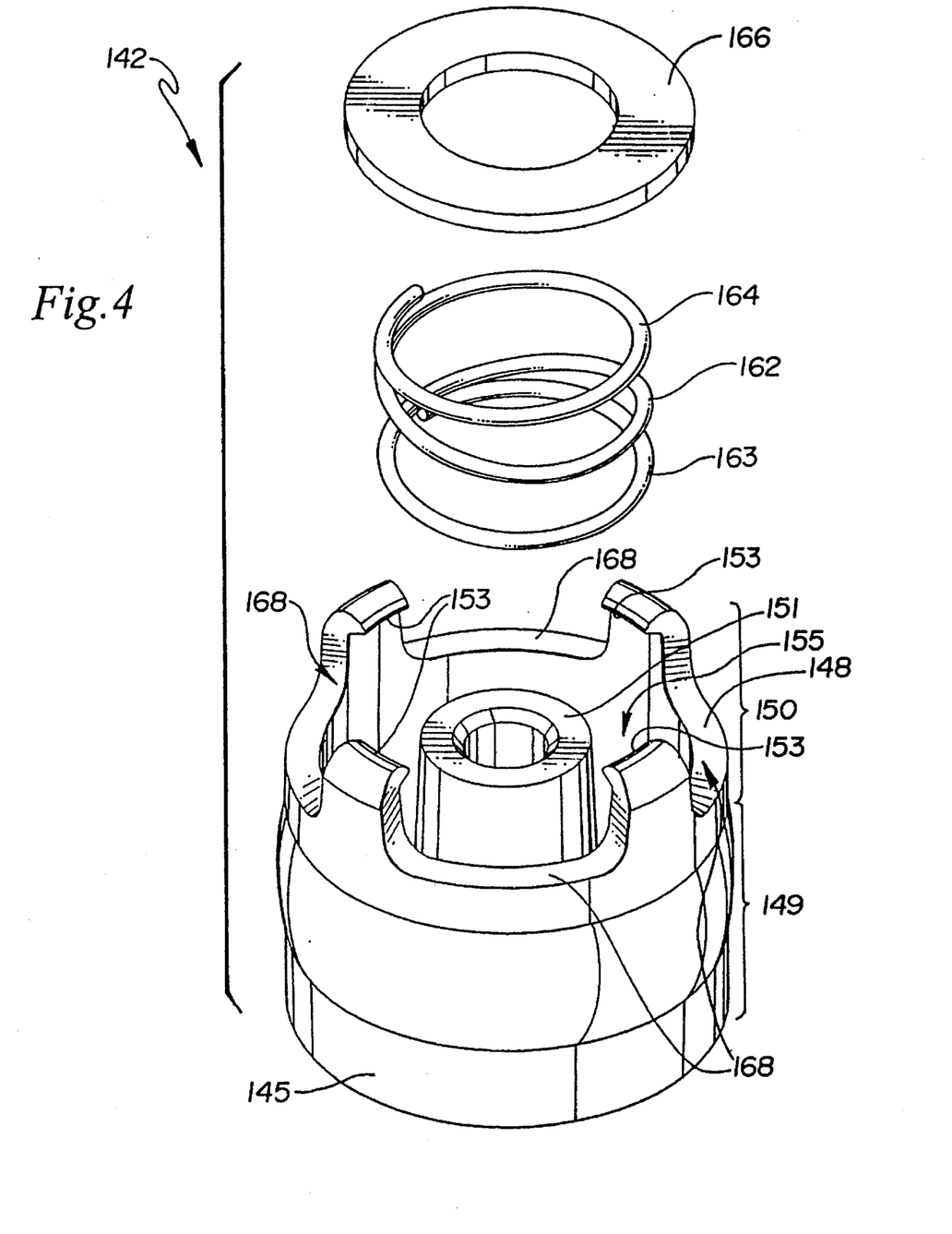
FIG. 4 is an assembly view of a corner roller assembly.
Figure 5:
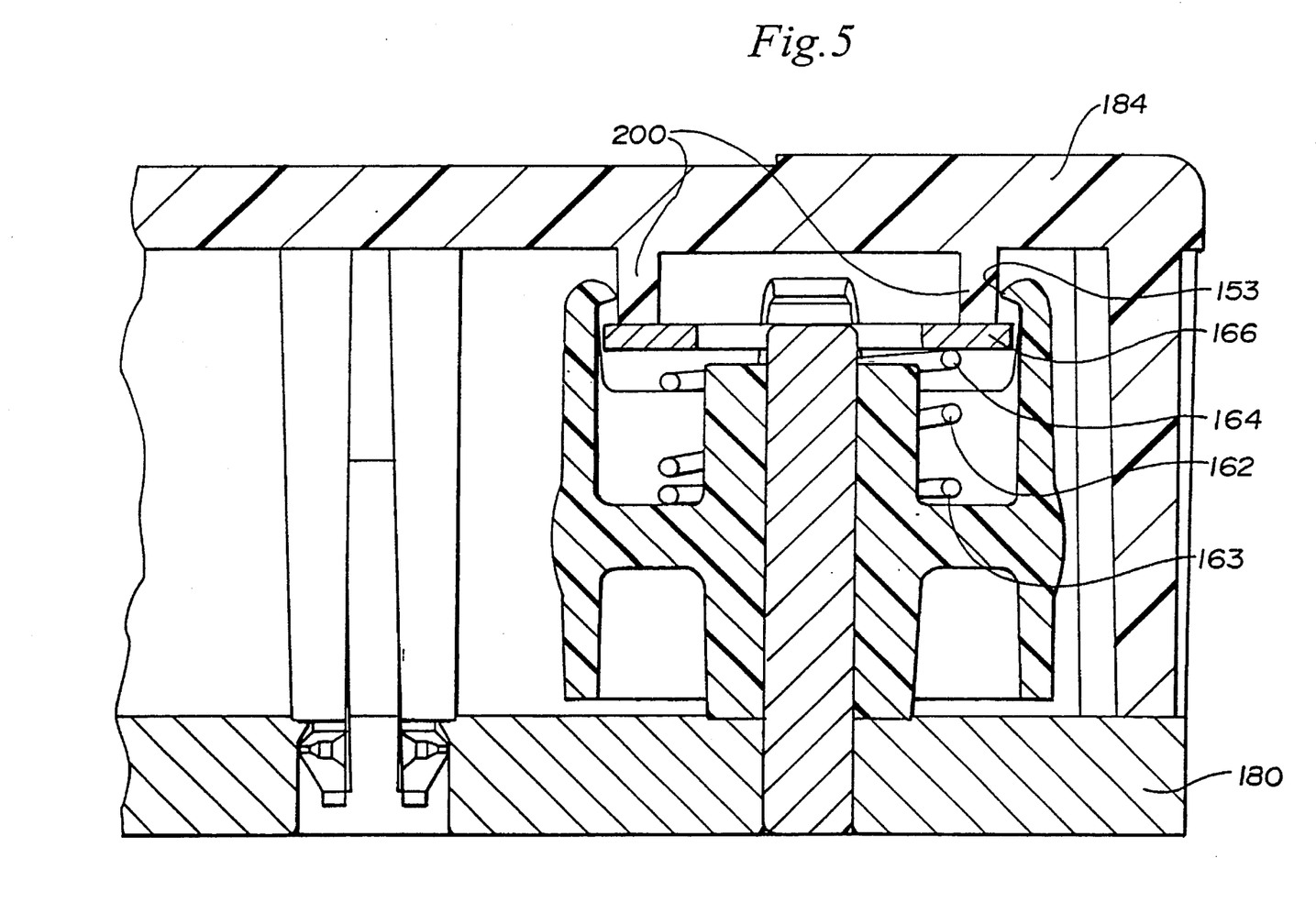
FIG. 5 is a section view of the corner roller assembly of FIG. 4 within a tape cartridge.

FIGS. 4 and 5 disclose another embodiment of a corner roller assembly 142 designed to achieve high tape tension, as well as producing a uniform tape tension with respect to drive force over a wide speed range. This permits use of a lower power drive mechanism. Corner roller assembly 142 comprises a corner roller 145 having an outer wall 148 designed for contact with a tape drive belt and an inner wall 151 suitable for mounting the corner roller on an axial mounting structure. Outer wall 148 comprises a first portion 149 designed for contact with the drive belt and a second portion 150 designed for retaining other components of the assembly within the corner roller. Outer wall 148 and inner wall 151 define an annular space or region 155 between the two wall structures. A fatigue resistant metal spring 162 is positioned within annular region 155. As in the embodiment shown in FIGS. 2 and 3, fatigue resistant metal spring 162 has a first end coil portion 163 and a second end coil portion 164. Means for retaining spring 162 within the annular region comprises thrust washer 166 and corner roller second portion 150. Second portion 150 comprises spring retaining shoulder structures 153 designed for holding thrust washer 166 within the annular region of the corner roller.

In the embodiments of FIGS. 1–5, the thrust washer height, and therefore the spring load, is determined by contact with bosses 200 extending from covers 84, 184. It is recognized that in certain configurations of tape cartridge, it is possible to invert the orientation of corner roller assemblies 42, 142 so that bosses 200 would protrude from baseplates 80, 180 rather than from the cover. In either of the above orientations, use of a snap fit baseplate and cover assembly greatly facilitates the assembly of tape cartridges by providing means for biasing or loading the metal springs 62, 162 simultaneous with assembly. Corner roller assembly 142 further enhances manufacturing of tape cartridges by having fewer parts than most assemblies and by allowing pre-assembly and loading of the spring with a down-loading ram applied to thrust washer 66, 166. This allows quality and performance verification prior to placement into tape cartridges, which provides improved reliability and ease of cartridge assembly.

Figure 6:
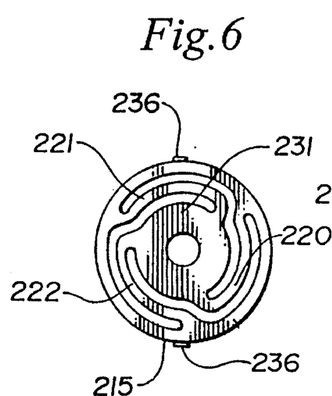
FIG. 6 is a plan view of a multi-fingered spring washer.
Figure 7:
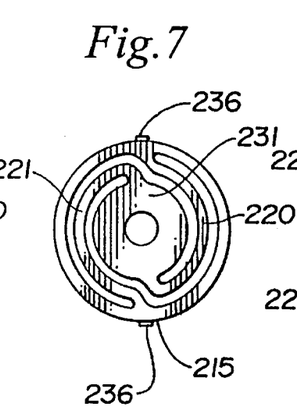
FIG. 7 is a plan view of a multi-fingered spring washer.
Figure 8:
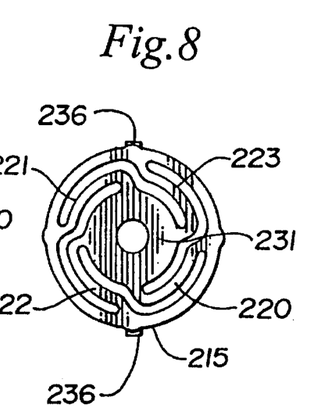
FIG. 8 is a plan view of a multi-fingered spring washer.
Figure 9:
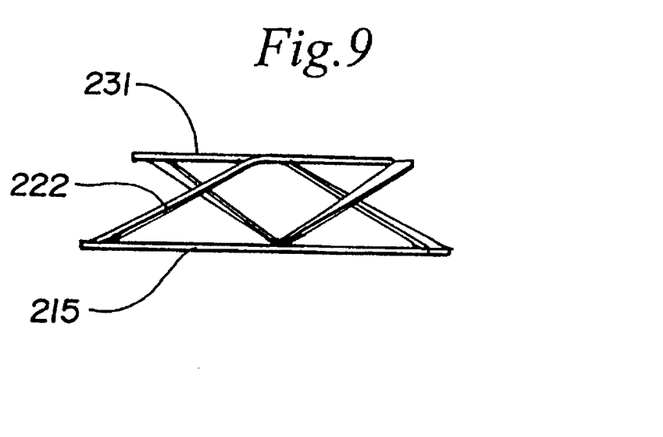
FIG. 9 is a side view of a formed multi-fingered spring washer.

FIGS. 6–8 disclose in plan view, and FIG. 9 in side view, another embodiment of the invention in which the fatigue resistant metal spring comprises a spring washer 215 having a plurality of partially separated spring fingers 220, 221, 222, 223. The spring fingers are connected to a central portion 231 designed for contacting an end portion of a corner roller central section. Central portion 231 preferably has a center aperture for receiving an end portion of a corner roller axial mounting structure. A circumferential tab 236 provides means for simple connection of the spring washer to a portion of the cartridge housing. Prior to use, each spring washer is formed to a controlled height using a form die, such as a male female die. Again, this embodiment also allows for ease of manufacture assembly and testing of the spring washer prior to placement in a tape cartridge.

Spring washer 215 is secured to the cartridge housing so that the center portion 231 contacts the tops of rollers 35 and 37. Spring washer 215 is assembled between the cartridge shell and the corner roller, thereby applying a downward force on the roller toward the cartridge baseplate. In one embodiment, the inner surface of the cartridge shell is lowered in the area of the corner rollers to facilitate contact between the roller and the cartridge shell. Due to the fact that the fingers of spring 215 are oriented substantially along an axial direction of the flattened spring, as opposed to a radial direction, the arms of the spring may be longer than the radius of the flattened spring, thereby providing a lower spring rate and decreased variability from spring to spring.

Figure 10:
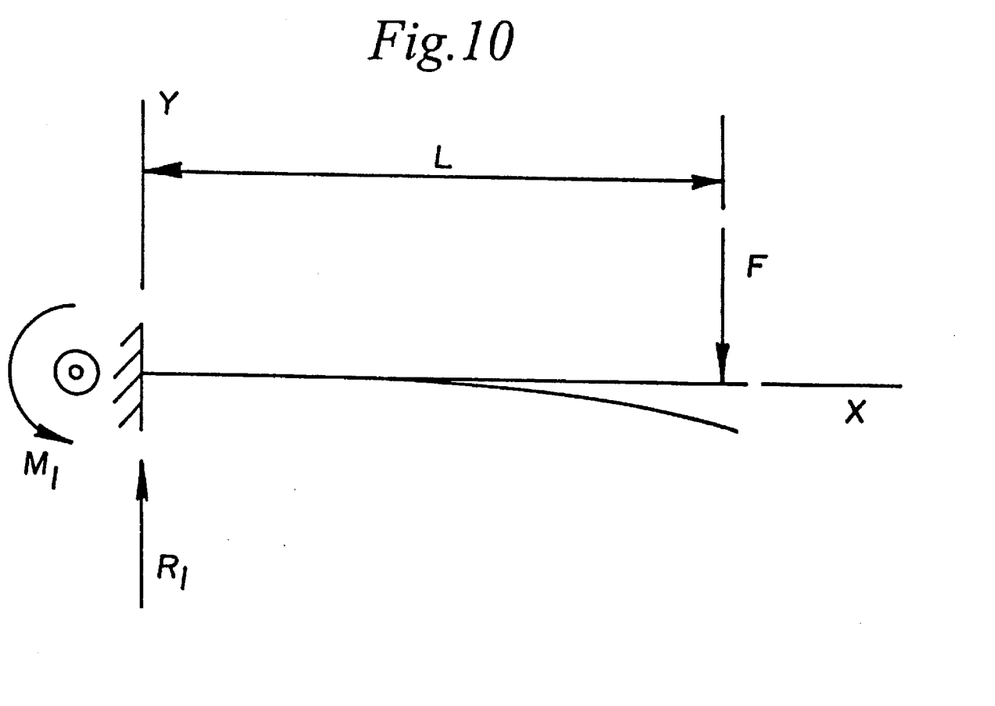
FIG. 10 is a vector model of a cantilevered beam.

Use of a metal spring in the above embodiments pushes the corner roller down against the enclosure, i.e. baseplate, and increases the corner roller's drag. The variance in drag is reduced by using a spring with a low spring rate and by virtually eliminating any end play effects in which axial movement of the corner roller on a corner roller pin occurs. What is meant by a low spring rate in the above embodiments is a spring rate less than about 10 kg/cm, or more preferably less than about 5 kg/cm. The invention assumes that the spring which is used does not deform, i.e., the elastic limit of the material is not exceeded. Therefore, it is a linear spring and the spring rate (K) is constant. For a constant spring rate, $$K=F/y \qquad \text{Eq. 1}$$

in which F is force and y is deflection. For simplification, all of the springs contemplated for use can be modeled as cantilevered beams as shown in FIG. 10.

$$M=F(x-L) \qquad \text{Eq. 2}$$

in which M is moment.

A material that is elastic obeys Hooke's law, $$\sigma=E\beta \qquad \text{Eq. 3}$$

in which σ is stress, E is Young's modulus, and ε is strain. For a beam in flexure, then $$\sigma=-(My)l \qquad \text{Eq. 4}$$

in which l is the second moment of area, and $$\epsilon=-(dx)/(ds) \qquad \text{Eq. 5}$$

in which dx is the differential element of the x axis and ds is the differential element of the neutral axis. Substituting into Hooke's Law equation gives $$-(My)/l=-E((dx)/(ds)). \qquad \text{Eq. 6}$$

Rearranging and simplifying gives $$y=(El)/(F(x-L))((dx)/(ds)) \qquad \text{Eq. 7}$$

and differentiating yields, $$y=((Fx^2)/(6El))(x-3L) \qquad \text{Eq. 8}$$

Of principal interest here is the deflection at the load where x=L, so $$Y=-(FL^3)/(3El). \qquad \text{Eq. 9}$$

Rearranging provides, $$-(3EI)/(L^3) = F/Y = K \qquad \text{Eq. 10}$$

E is constant for a given material and I is constant for a given cross section of material, so $$K \sim (I/L^3). \qquad \text{Eq. 11}$$

Thus, the spring rate of a beam is proportional to the inverse of the cubed length, or more generally as L increases then K decreases. Also, if the cross sectional area of the beam is decreased, then the second moment of area decreases and K also decreases. These analyses support use of fatigue resistant metal springs in which each spring has an active spring arm length which is greater than one half the diameter of the spring. Similarly, the spring may have an active spring arm length of greater than one half the diameter of the annular region, or even greater than one half the diameter of the corner roller, and function within the scope of this invention.

The embodiments of corner roller assemblies which use the teachings of this invention allow controlled corner roller drag with minimal variance, low cost, few added parts, end play control, automation ready, low power consumption and reduced noise. Preferred fatigue resistant metal springs comprise coil springs, tapered coil springs, and formed spring washers arranged with multiple spring fingers. The springs are preferably selected from a spring steel construction, although any recognized quality spring metal may be used provided that it maintains essentially zero creep under constant load and meets any other technical specifications unrelated to the spring rate concerns of this invention. A preferred spring metal is stainless steel, although similar metals or metal alloys demonstrating the desirable features disclosed above are suitable.

We claim:

1. A corner roller tape tension enhancer assembly for use with a corner roller in a belt driven magnetic tape cartridge having components enclosed within a cartridge housing, comprising:
   (a) a cylindrical corner roller having an outer wall with a lower portion proximal a baseplate of the cartridge and an upper portion, wherein the lower portion contacts a drive belt which is driven with a drive force from a drive mechanism external of the assembly,
   an inner wall suitable for mounting the corner roller on an axial mounting structure, and
   an annular region between the outer wall and the inner wall, wherein the upper portion of the outer wall further comprises a shoulder structure extending into the annular region; and
   (b) a fatigue resistant metal coil spring having a thrust washer positioned at one end thereof, wherein the spring and the thrust washer are positioned in the annular region and retained against the shoulder structure for increasing the drag force on the corner roller by a constant value, thereby controlling the tension of the magnetic tape and improving the uniformity of magnetic tape tension with respect to belt drive force over a wide range of tape speeds.

2. The corner roller tape tension enhancer assembly of claim 1 in which the range of tape speeds is from 2.5 mm/second to 3048 mm/second.

3. The corner roller tape tension enhancer assembly of claim 1 in which the spring has a low spring rate which is less than about 10 kg/cm.

4. The corner roller tape tension enhancer assembly of claim 3 in which the low spring rate is achieved by using a spring with an active spring arm length that is greater than the radius of the spring.

5. The corner roller tape tension enhancer assembly of claim 3 in which the low spring rate is achieved by using a spring with an active spring arm length that is greater than the radius of the corner roller.

6. The corner roller tape tension enhancer assembly of claim 1 in which the cylindrical corner roller and the thrust washer are each shaped to maintain the thrust washer speed of rotation the same as the speed of rotation of the inner wall.

7. The corner roller tape tension enhancer assembly of claim 6 in which the cylindrical corner roller structure is keyed for receipt of a protruding key structure formed as part of the thrust washer.

8. The corner roller tape tension enhancer assembly of claim 6 further comprising a retaining ring for retaining the thrust washer and coil spring within the annular space of the corner roller.

9. The corner roller tape tension enhancer assembly of claim 1 comprising a spring centering taper in a web of the corner roller extending between the outer wall and the inner wall.

10. The corner roller tape tension enhancer assembly of claim 1 in which the spring has a substantially constant spring rate over time under static load which varies less than 1%.

11. The corner roller tape tension enhancer assembly of claim 1 in which the corner roller drag force varies by less than about 20 percent over time.

12. The corner roller tape tension enhancer assembly of claim 1 in which the cartridge housing comprises a snap fit baseplate and cover assembly designed for placing a substantially constant load on the fatigue resistant metal spring.

13. The corner roller tape tension enhancer assembly of claim 1 in which the spring is a spring washer having a plurality of partially separated spring fingers connected to a central portion designed for contacting an end portion of a corner roller central section, the central portion also having a center aperture for receiving an end portion of a corner roller axial mounting structure.

14. The spring washer of claim 13 in which the washer comprises a circumferential tab suitable for connection to a portion of the cartridge housing.

15. The corner roller tape tension enhancer assembly of claim 1 in which the spring has a summation of spring force variations over time which remains substantially constant to within a standard deviation of 1%.

16. A belt driven magnetic tape cartridge comprising:
   (a) a cartridge housing defining an enclosure for cartridge components, the housing comprising a baseplate and a cover;
   (b) a pair of reel hubs supported for rotation on spaced parallel axes within said housing;
   (c) means defining a tape path within said enclosure extending between said reel hubs;
   (d) a length of magnetic tape extending along said tape path, said tape being wound on said reel hubs in opposite directions about the axes of said reel hubs;
   (e) a belt driving roller supported within said enclosure for rotation about a stationary axis parallel to the axes of said reel hubs, said driving roller being spaced from said reel hubs and being positioned between said reel hubs toward an edge of said enclosure;
   (f) a pair of belt guiding corner rollers supported within said enclosure, said belt guiding corner rollers being positioned relative to said reel hubs and said belt driving roller to define a belt guide path around said belt driving roller and said belt guiding corner rollers, said belt guide path being spaced from said tape path, passing between said reel hubs from said belt driving roller to each of said belt guiding corner rollers, wherein said corner rollers comprise an outer wall with a lower portion proximal the baseplate and an upper portion, an inner wall, an annular region between the outer wall and the inner wall, and wherein said upper portion further comprises a shoulder structure extending into said annular region;

(g) a thin continuous, flexible, elastic belt extending along said belt guide path and contacting said tape at the periphery of said reel hubs; and (h) a corner roller tape tension enhance member for use with at least one of said corner rollers, the member comprising a fatigue resistant metal coil spring with a thrust washer positioned against one end thereof, wherein the spring and the thrust washer are positioned in the annular region and retained against the shoulder structure of the corner roller for increasing drag force on the corner roller by a constant value, thereby controlling tension of the magnetic tape and improving the uniformity of magnetic tape tension with respect to belt drive force over a wide speed range.

17. The cartridge of claim 16 in which the spring has a low spring rate which is less than about 10 kg/cm.

18. The cartridge of claim 16 in which the spring is a spring washer having a plurality of partially separated spring fingers connected to a central portion designed for contacting an end portion of a corner roller central section, the central portion also having a center aperture for receiving an end portion of a corner roller axial mounting structure.

19. A corner roller for a data tape cartridge, comprising:

an outer wall comprising a lower portion proximal a baseplate of the cartridge, wherein the lower portion contacts a tape drive belt in the cartridge, and an open upper portion adjoining said lower portion, wherein the upper portion comprises at least one shoulder structure;

an inner wall designed for mounting the corner roller on an axial mounting structure attached to the baseplate of the cartridge; and an annular space between the outer wall and the inner wall;

wherein the shoulder structure comprises an elongate body which extends upward in a direction generally normal to the cartridge baseplate, and a shoulder attached to the body, and wherein the shoulder extends outward from said body and into the annular space.

20. A corner roller as claimed in claim 19, further comprising a spring positioned in the annular space, said spring having a first end proximal the cartridge baseplate and second end, wherein a thrust washer is positioned in the annular space at the second end of the spring, and wherein the spring and the washer are retained by said shoulder structure.

* * * * *

UNITED STATES PATENT AND TRADEMARK OFFICE
CERTIFICATE OF CORRECTION

PATENT NO.: 5,516,055
DATED: May 14, 1996
INVENTOR(S): Gerfast et al.

It is certified that error appears in the above-identified patent and that said Letters Patent is hereby corrected as shown below:

Title page, item [54],"Inventors:" should read:

--Sten R. Gerfast, Mendota Heights, Minn.;
Daniel C. Egan, Oakdale, Minn.;
Frank H. Phillips, Shoreview, Minn.;
Clarence W. Schultz, St. Paul, Minn.;
Ronald D. Stimpson, Camarillo, Calif.--

Col. 4, line 42, "$\sigma=E\beta$" should be --$\sigma=E\varepsilon$--.

Signed and Sealed this

Twenty-fourth Day of December, 1996

Attest:

BRUCE LEHMAN

*Attesting Officer*  *Commissioner of Patents and Trademarks*